United States Patent [19]
Attridge, Jr.

[11] 3,870,227
[45] Mar. 11, 1975

[54] COMFORT TEMPERATURE CONTROL SYSTEM FOR A ZONE

[75] Inventor: Russell G. Attridge, Jr., Columbus, Ohio

[73] Assignee: Ranco Incorporated, Columbus, Ohio

[22] Filed: Aug. 10, 1972

[21] Appl. No.: 279,743

[52] U.S. Cl. .................. 236/49, 165/16, 236/1 B, 236/91
[51] Int. Cl. ............................................. F24f 11/09
[58] Field of Search ............... 236/49, 1 B, 1 C, 91; 165/16, 26, 27; 98/33

[56] References Cited
UNITED STATES PATENTS

| | | | |
|---|---|---|---|
| 2,177,597 | 10/1939 | Haines | 236/1 C |
| 3,036,777 | 5/1962 | Budde | 236/51 X |
| 3,076,604 | 2/1963 | Robson | 236/10 |
| 3,203,258 | 8/1965 | Grayson | 74/3.5 |
| 3,433,295 | 3/1969 | Avery | 98/33 R |

*Primary Examiner*—William E. Wayner
*Attorney, Agent, or Firm*—Watts, Hoffman, Fisher & Heinke Co.

[57] ABSTRACT

The temperature in a zone is regulated by diverting more or less of a given flow of tempered air into and through the zone in accordance with the degree of variance from a set point temperature in the zone and the temperature of the flow of tempered air is regulated according to the variation from a set point of the resulting temperature of the air passed through the zone and recombined with that portion of the flow of tempered air which was undiverted into the zone.

4 Claims, 1 Drawing Figure

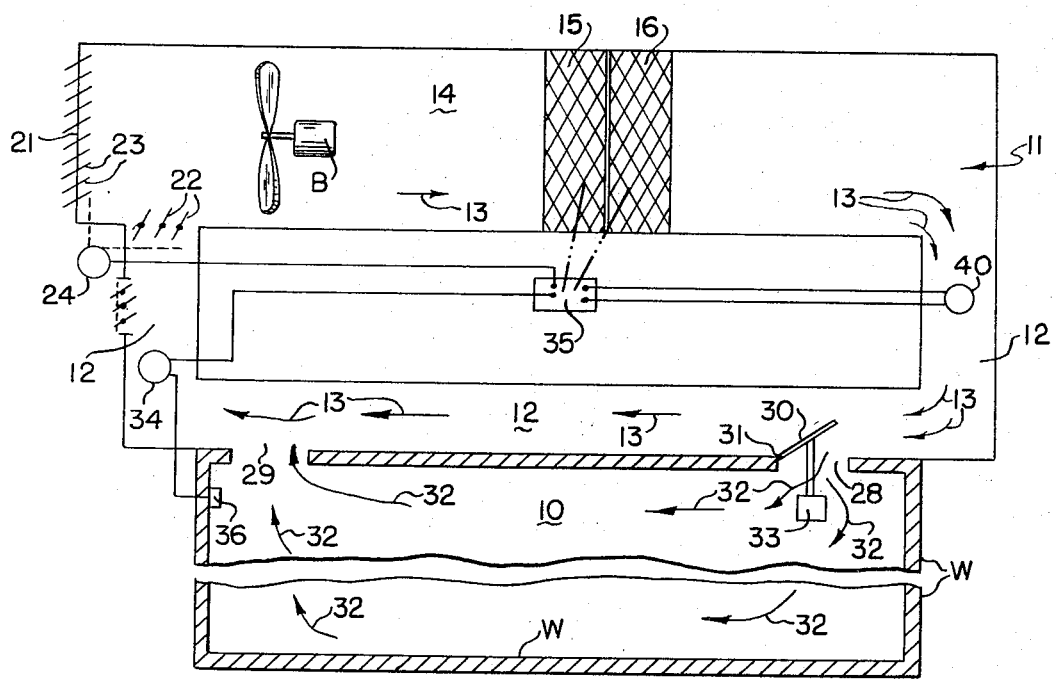

COMFORT TEMPERATURE CONTROL SYSTEM FOR A ZONE

BACKGROUND OF THE INVENTION

It has been a practice to control the temperature of a zone in a building, for example, by supplying tempered air from a heat exchanger to the zone through a duct with more or less air being diverted from the duct and into the zone according to the temperature in the zone. In such systems the exchanger temperature has been controlled by several different methods such as according to outside temperature, static pressure, or a combination of these methods. One disadvantage of these types of systems is that the degree of tempering of the air supplied to the zone does not necessarily correspond to the load in the zone and consequently the volume of tempered air passing through the zone varies and there is generally a discomforting swing in the temperature in the zone during tempering periods, particularly where heat loads in the zone vary appreciably. This condition exists because heat in various quantities may be supplied to the zone by internal variable factors such as occupants, sunshine or shadow, operation of electrical equipment and lighting.

THE PRESENT INVENTION

The present invention provides method and apparatus for controlling the temperature in a zone by passing a proportion of a given flow volume of a tempered heat transfer fluid, such as air, through a zone so as to maintain the zone at a given set point and at the same time, the temperature of the fluid supplied to the zone is regulated according to the variance from a set point resulting from recombining the fluid passed through the zone with that portion of the tempered fluid flow which was undiverted into the zone. As the tempering load required to maintain the zone at set point is reduced, the temperature of the fluid is brought nearer to the set point temperature of the zone. Thus, a maximum flow of tempering fluid is diverted into and through the zone and a minimum of energy is consumed in tempering the fluid by the exchanger to maintain the zone temperature. The invention therefore provides a relatively stable and comfortable temperature control in the zone with a maximum of economy in the use of energy.

In carrying out the invention in its preferred form an air duct system is provided for distributing a given flow of tempered air to the zone whose temperature is to be controlled. Means responsive to the variation of a temperature in the zone from a set point temperature are provided for diverting more or less of the tempered air flow from the duct into and through the zone so as to tend to maintain the set point temperature. Means are provided to sense the temperature resulting from the mixture of the tempered air flow after passing through the zone with that portion of the tempered air flow which was undiverted from the duct system, and control means responsive to the temperature sensing means to control the temperature of the tempered air flow so as to tend to maintain a set temperature at the sensing means.

Other objects and advantages of the invention will be apparent from the following description of a preferred form thereof, reference being made to the accompanying drawing wherein a temperature control system for a zone 10 is shown more or less schematically.

Zone 10 may be a room or other generally closed area in a building, having enclosing walls W. The temperature of the zone is maintained at or near a set point by diverting more or less of a continuous volume flow of tempered air into and through the zone. Accordingly, a continuous flow of air is provided for the zone by an air distribution system 11 comprising an air duct section 12. Air may be forcefully circulated through the distribution system 11 in the direction of arrows 13 by a blower B, which preferably operates continuously during usage of the temperature control system. The blower B is located in an inlet chamber 14 of the air distribution system and is operative to force air through heating and cooling heat exchangers 15,16. Air discharged from the exchangers 15,16 is directed into the duct section 12 which is arranged so that more or less of the flow of tempered air can be diverted into the zone 10 and a corresponding flow returned from the zone into the duct, as is described more fully hereinafter.

In the form shown, the intake chamber 14 is adapted to receive air from either the duct section 12 or from the atmosphere through a dampered opening 21 or from a combination of these two sources. A damper 22 controls the flow of air from the duct 12 into the intake chamber or to the atmosphere, and dampers 23 control the flow of atmospheric air into the inlet chamber 14. The dampers 22,23 are preferably operated automatically by a suitable controlled motor 24. The damper 22 is operative to discharge to atmosphere whatever proportion of the air flow in the duct 12 corresponds to the proportion of air flow entering the distribution system through the opening 21. The purpose of the dampers 22,23 is to permit the use of atmospheric air for cooling the zone, under certain temperature conditions, rather than using the cooling exchanger 16.

The exchanger 15 may be the heating bonnet of a fuel burning furnace, which furnace is controlled automatically to maintain suitable temperatures in the exchanger. The exchanger 16 may comprise an evaporator of a refrigerating system having suitable controls for initiating operation and maintaining a desired temperature in the evaporator. It is to be understood that any suitable types of cooling and heating systems could be employed to provide air chilling and heating temperatures in the exchangers 15,16. In the form shown, the exchanger 15 is heated only during the heating mode of the system and the exchanger 16 is chilled during the cooling mode of the system. The controls for the exchangers 15,16 may be set either manually or automatically, by means not shown, to provide either heating or cooling modes of operation.

Air discharged from the exchangers 15,16 may be more or less diverted from the duct section 12 and into the zone 10 through an inlet opening 28 in the wall between the duct and zone interior. Zone air is returned to the duct section 12 through a return air outlet 29 downstream from the opening 28. In the form of the invention shown, a damper 30, pivoted at 31, is adapted to divert air flow in the duct section 12 into the zone as the damper swings from the opening 28 towards the far wall of the duct. The walls forming the zone 10 are substantially closed, and consequently as a flow of air is diverted from the duct 12 into the zone, a corresponding flow of air is returned from the zone to the duct through the outlet 29. The resulting flow of air through the zone is illustrated by the arrows 32. Air returned to the duct 12 from the zone mixes with the undiverted flow of air, if any, which bypasses the zone through the duct so that the temperature of the air mixture will be a modification of the temperature of the zone discharge air and the temperature of the tempered air flowing in the duct 12.

The degree of opening of the vane 30 into the duct 12, and consequently the proportion of air flow in the duct section 12 diverted into and through the zone 10, is regulated according to the extent of variation of the average zone temperature from a set point. This is effected by a damper actuator unit 33 which includes a control element responsive to an average zone temperature and is effective to cause an angular opening of the damper 30 into the duct 12 in accordance with the excursion of the zone temperature from a set point. The unit includes means in the zone for manually varying the set point temperature. Also, the unit 33 includes means to automatically reverse its mode of operation in response to a change in temperature of the air supplied to the damper through the duct 12. Thus, when the supplied air temperature is above the set point of the unit 33, the unit will be in the heating mode and the damper 30 will be actuated to increase its degree of opening in response to a decrease in zone temperature below the set point, and vice versa. When the supplied air temperature is below the set point of the unit 33, the damper 30 is operated to increase its opening in response to an increase in zone temperature above the set point, and vice versa. Control units having the functions as described are well known and further description thereof is unnecessary to be understanding of the invention. Preferably, the damper 30 in its "closed" position admits a slight air flow into the zone to prevent air stagnation and stratification.

According to the present invention, the temperature of the air flowing into the duct section 12 is regulated in accordance with the temperature resulting from the mixture of the air flowing in the duct section which was undiverted by the damper 30 and bypassed the zone, and the air flow returned to the duct section from the zone. In the embodiment of the invention shown, the temperature of the air at a point in the duct section 12 immediately downstream of the outlet 29 is sensed by a control sensor 34. The sensor 34 comprises a thermistor in a bridge circuit which is connected with control circuitry 35 for controlling operation of the damper control mechanism 24, the heating means for the exchanger 15 and the cooling means for the exchanger 16. The control circuitry 35, including the sensor 34, may be similar to that for controlling the heating and cooling units of the system described in U.S. Pat. No. 3,645,325. Suffice to say, during the heating mode of the control system, when the temperature at the sensor 34 decreases below its set point temperature, which may be set by a control element 36 connected in the circuitry, the control circuitry 35 activates the furnace for heating the exchanger 15. The furnace will be shut down when the temperature of the sensor increases to the set point.

During the cooling mode of the system and when the temperature of the sensor 34 rises above its set point temperature, the control circuitry 35 produces a signal which actuates the refrigerating system, comprising the exchanger 16. When the temperature of the sensor returns to its set point, or slightly below, the refrigeration system will be shut down.

When the temperature at the sensor 34 is above the set temperature of the zone and the outside air temperature can provide atmospheric cooling the damper motor 24 is operated to gradually increase the circulation of outside air through the air distribution system 11. When the temperature at the sensor 34 decreases, the motor 24 is operated to close the damper 23 and prevent intake of outside air into the system 11. Thus, the control circuitry 35 is adapted to actuate the motor 24 for the dampers 22,23 so as to utilize outside air for moderate cooling needs at which time the refrigerating evaporator 16 would be inoperative.

Preferably, the set point of the sensor 34 is a few degrees above or below the set point of the zone unit control 33 during heating and cooling, respectively. The set point can be changed by the circuitry 35 when the mode of the system is changed from heating to cooling, or vice versa. Alternatively, the set point could be effectively changed by subjecting the sensor 34 to the influence of the prevailing load in the zone. For example, the sensor might be located to be affected to a degree by the ambient temperature. Further, it is preferable that a sensor 40 be provided in the circuitry 35 which is effective to shut down the furnace should a maximum temperature occur and thereby prevent a wide swing in temperature of the air discharging from the exchanger 15,16.

The operation of the temperature control system is as follows: Assuming that the temperature in the zone 10 is at the set point of the sensor 34, neither the heating or cooling exchangers 15 or 16 will be operating and a minimum ventilation of outside air will be circulated through the system 11. The damper 30 will throttle the flow of air into inlet 28 from the duct section 12 and the balance of the air flowing in the duct 12 will bypass the zone 10 and strike sensor 34.

In the event the temperature in the zone 10 commences to rise above the set point of the unit 33, the unit opens the damper 30 and diverts a portion of the flow of air through the duct 12 into the zone. Air passing through the zone discharges through the outlet 28 into the duct 12 and causes the temperature at the sensor 34 to increase above its set point. This initiates operation of the damper motor 24 to provide a maximum intake of outside air to the air distribution system. If the temperature in the zone continues to rise, the circuitry 35 causes motor 24 to close the outside air inlet dampers 22,23 and initiate operation of the cooling exchanger 16. If the heat load in the zone is not dissipated by the air entering the zone from the duct section 12, the unit 33 responds to the increase in temperature from the set point and further increases the opening of damper 30 and diverts a greater volume of air into the zone. This results in a greater volume of zone air returning into the duct section 12 through the opening 29 and mixing with the lesser volume of air bypassing the zone through the duct. The air returned to the duct system from the zone will be above the set point of the sensor 34 and with its greater volume as compared to the reduced volume of air in the duct bypassing the zone tends to increase the temperature at the sensor 34.

As the temperature of the sensor 33 in the zone falls towards the set point, the damper 30 moves to reduce the flow of tempered air into the zone. This effects a greater flow of tempered air bypassing the zone and correspondingly reduces the quantity of air flowing back to the duct from the zone. The chilled bypass air has a greater influence in reducing the air temperature at the sensor 34 toward the set temperature, thereby assuring shutting down of the refrigeration system. As the temperature in the zone increases the damper 30 is operated to divert a greater volume of air flow from the duct 12 into the zone. This action increases the effect of the zone air discharge on the sensor 34 tending to cause operation of the refrigeration system. It will be seen that the temperature of the mixture of the zone air returned to the duct 12 and the air in the duct bypassing the zone is an accurate measure of the heat load in the zone and that the refrigeration system will be operated most efficiently to maintain proper cooling of the zone.

The control system functions similarly in a heating mode. That is to say, when the temperature of the zone falls below the set point of the control unit 34, the damper motor 24 will be operated to reduce the opening of outside dampers 22,23 and finally close these dampers as the temperature at the sensor 34 decreases. As the temperature in the zone falls below the set point of the control unit 33, the damper 30 is moved to divert air from the duct section 12 into the zone. The zone air returned to the duct reduces the temperature of the sensor 34 below set point and the control system 35 is actuated to provide heating of the exchanger 15 and an increase in temperature of air entering the duct 12. As the temperature in the zone decreases further, the damper 30 is operated to divert a greater proportionate flow of air from the duct 12 into the zone. A correspondingly greater proportion of zone air is returned to the duct 12 and has a greater cooling effect on the sensor 34. Thus, the control system 35 will maintain heating of the exchanger 15 until the temperature in the zone causes a raising of the temperature at the sensor 34.

It will be appreciated that the resultant operations of the damper 30 in diverting more or less air flow into the zone and the control of the temperature of the air discharged into the duct 12 from the exchangers 15,16 provide a stable temperature in the zone and that the heat required to be put into or removed from the air distributed to the zone is maintained at a minimum. Thus, the invention provides a stable, economically operated temperature control system.

It is to be understood that the invention could be practiced to control the temperature in a plurality of zones connected with the duct 12 in the manner described with reference to zone 10, i.e., with the return air opening into the duct 12 upstream from the sensor 34. However, for sake of brevity, only one zone has been shown and described.

The effect of the control system is to bring the tempering means, said system providing for a variable flow of fluid to said zone and for bypassing the remaining fluid of said given flow around said zone;
b. sensing the temperature in said zone;
c. altering the flow of fluid to bypass more or less fluid around said zone in response to sensed changes in zone temperature to maintain a predetermined zone temperature level;
d. mixing the fluid which has flowed to the zone with the fluid which has been bypassed around the zone;
e. sensing the temperature of the mixed zone and bypass fluids to determine the load on said zone;
f. controlling the temperature of said given flow of fluid flowing toward said zone in response to the sensed temperature of the mixed zone and bypass fluids; and,
g. maintaining the flow rate of fluid to the zone relatively constant except when the load on the zone changes substantially and abruptly.

2. A method as claimed in claim 1 further including sensing the temperature of fluid directed from the tempering means towards the zone and affecting operation of the tempering means in response thereto.

3. A method as claimed in claim 1 further including maintaining the temperature of the mixed zone and bypass fluids substantially at a predetermined level.

4. An air tempering system for a zone defined by an air conditioned space and a bypass passage through which zone air may bypass the space, the system comprising:
a. air tempering means;
b. air circulating duct means for directing a given flow of air from said tempering means toward said zone and returning air from said zone to said air tempering means, said bypass passage formed by duct structure extending between first and second locations of said duct means to form the air bypass around said space;
c. flow diverting means for controllably governing the flow of air into said space and thereby also controlling the air flow through said bypass duct structure from said first to said second location;
d. thermostatic means in said space for governing operation of said flow diverting means in response to sensed space air temperatures, said thermostatic means operable to maintain an established space air temperature and to increase and reduce air flow rates to said space in response to increases and decreases, respectively, of the load on said space as reflected by space air temperatures which differ from the established temperature;
e. air temperature sensor means disposed between said second location and said air tempering means for sensing the temperature of mixed bypass and space air returning to said tempering means and for producing signals corresponding to mixed air temperatures which vary from a preset temperature